United States Patent
Ginsburg et al.

(10) Patent No.: US 12,299,577 B2
(45) Date of Patent: May 13, 2025

(54) TENSOR PROCESSING USING LOW PRECISION FORMAT

(71) Applicant: NVIDIA CORPORATION, Santa Clara, CA (US)

(72) Inventors: Boris Ginsburg, Santa Clara, CA (US); Sergei Nikolaev, Santa Clara, CA (US); Ahmad Kiswani, Santa Clara, CA (US); Hao Wu, Hanzhou (CN); Amir Gholaminejad, Santa Clara, CA (US); Slawomir Kierat, Mountain View, CA (US); Michael Houston, Saratoga, CA (US); Alex Fit-Florea, Belmont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1626 days.

(21) Appl. No.: 15/624,577

(22) Filed: Jun. 15, 2017

(65) Prior Publication Data

US 2017/0372202 A1    Dec. 28, 2017

Related U.S. Application Data

(60) Provisional application No. 62/350,620, filed on Jun. 15, 2016.

(51) Int. Cl.
*G06N 3/084* (2023.01)
*G06F 17/16* (2006.01)
(Continued)

(52) U.S. Cl.
CPC ............. *G06N 3/084* (2013.01); *G06F 17/16* (2013.01); *G06N 3/045* (2023.01); *G06N 3/088* (2013.01); *G06N 3/04* (2013.01)

(58) Field of Classification Search
CPC ............................ A61B 5/1101; A61B 5/4082
See application file for complete search history.

(56) References Cited

U.S. PATENT DOCUMENTS 6,151,025 A    11/2000    Yen et al.
6,448,968 B1    9/2002    Pfister et al.
(Continued)

FOREIGN PATENT DOCUMENTS

CN    102362274 A    2/2012
CN    104915322 B    9/2015

OTHER PUBLICATIONS

'Elements of artificial neural networks': Mehrotra, MIT press, 1997 (Year: 1997).*

(Continued)

*Primary Examiner* — Kevin W Figueroa
(74) *Attorney, Agent, or Firm* — Taylor English Duma L.L.P.

(57) ABSTRACT

Aspects of the present invention are directed to computer-implemented techniques for improving the training of artificial neural networks using a reduced precision (e.g., float16) data format. Embodiments of the present invention rescale tensor values prior to performing matrix operations (such as matrix multiplication or matrix addition) to prevent overflow and underflow. To preserve accuracy throughout the performance of the matrix operations, the scale factors are defined using a novel data format to represent tensors, wherein a matrix is represented by the tuple X, where X=(a, v[.]), wherein a is a float scale factor and v[.] are scaled values stored in the float16 format. The value of any element X[i] according to this data format would be equal to a*v[i].

20 Claims, 4 Drawing Sheets

(51) Int. Cl.
  *G06N 3/04*      (2023.01)
  *G06N 3/045*     (2023.01)
  *G06N 3/088*     (2023.01)

(56) References Cited

U.S. PATENT DOCUMENTS

| | | | | |
|---|---|---|---|---|
| 6,996,596 | B1* | 2/2006 | Ho | G06F 7/483 |
| | | | | 708/495 |
| 7,844,352 | B2 | 11/2010 | Vouzis et al. | |
| 7,962,719 | B2 | 6/2011 | Pitsianis et al. | |
| 8,108,760 | B2 | 1/2012 | Gross et al. | |
| 8,879,796 | B2 | 11/2014 | Rodriguez Serrano | |
| 9,412,176 | B2 | 8/2016 | Song et al. | |
| 9,621,346 | B2 | 4/2017 | Gentry et al. | |
| 9,647,809 | B2 | 5/2017 | Keusgen et al. | |
| 2007/0086655 | A1* | 4/2007 | Simard | G06K 9/4628 |
| | | | | 382/190 |
| 2008/0170778 | A1* | 7/2008 | Luo | G06T 5/005 |
| | | | | 382/164 |
| 2009/0172349 | A1* | 7/2009 | Sprangle | G06F 9/30043 |
| | | | | 712/4 |
| 2009/0292750 | A1* | 11/2009 | Reyzin | G06F 7/483 |
| | | | | 708/209 |
| 2011/0173152 | A1* | 7/2011 | Rodriguez Molinero et al. | |
| | | | | A61B 5/4839 |
| | | | | 706/54 |
| 2011/0302231 | A1* | 12/2011 | Huggett | G06F 7/4991 |
| | | | | 708/208 |
| 2016/0358043 | A1* | 12/2016 | Mu | G06K 9/6217 |
| 2017/0358306 | A1* | 12/2017 | Xue | G10L 17/18 |

OTHER PUBLICATIONS

'Deep Learning with Limited Numerical Precision': Gupta, 2015, Proceedings of the 32nd International Conference on Machine Learning.*

Cichocki, Andrzej. "Era of big data processing: a new approach via tensor networks and tensor decompositions." arXiv preprint arXiv:1403.2048 (2014). (Year: 2014).*

Smith, Shaden, et al. "SPLATT: Efficient and parallel sparse tensor-matrix multiplication." 2015 IEEE International Parallel and Distributed Processing Symposium. IEEE, 2015. (Year: 2015).*

Second Office Action issued by China National intellectual Property Administration on Sep. 3, 2020 for Chinese Application No. 201710451960.3.

Gupta, S., Agrawal, A., Gopalakrishnan, K., & Narayanan, P. (Jun. 2015). Deep learning with limited numerical precision. In International Conference on Machine Learning (pp. 1737-1746).

Office Acton received in DE Patent Application No. 10 2017 113 232.5, mailed on Nov. 30, 2020, 13 pages.

Ai-Jun, C., et al., "Digital Image Processing and Its MATLAB Implementation", Harbin: Northeast Forestry University Press, pp. 1-5 (2008). (English Translation not available online).

Third Office Action and Search received for Chinese Patent Application No. 201710451960.3, mailed on Feb. 26, 2021, 33 pages. (English Translaton Submitted) .

Fourth Office Action received for Chinese Patent Application No. 201710451960.3, mailed on May 31, 2021, 12 pages.

* cited by examiner

TENSOR PROCESSING USING LOW PRECISION FORMAT

FIELD OF THE INVENTION

Embodiments of the present invention refer generally to computer-implemented techniques for machine learning. More specifically, embodiments of the present invention are directed to a framework for improved training of deep learning for neural and convolutional networks.

BACKGROUND OF THE INVENTION

Machine learning is the field of computer science directed to the use of computer-implemented algorithms for problem solving through pattern recognition and adaptive processing of a data set. In contrast with regular "static" programming, machine learning applications are characterized by being able to generate predictive data models by iteratively refining models from a data set without explicit programming. Artificial neural networks are among the most popular machine learning algorithms, and use distributed parallel processors to perform parameterized computations on input data at multiple, interconnected "neurons" (processing units) distributed throughout one or more internal or "hidden" layers between an input layer and an output layer to calculate an output that is compared to a target or reference output. Artificial neural networks are parameterized through weights assigned to the connections between neurons of adjacent layers The parameters of the networks are continuously updated to reduce and eventually eliminate the difference in output until an accurate data model is achieved. "Deep" neural networks refer to neural networks that consist of 3 or more layers.

One popular artificial neural network training method is called backward propagation (or back propagation). Beginning with a pre-determined (often random) set of weights, the weights are refined by repeatedly applying a two-phase cycle of operations that includes a forward pass followed by gradient backward propagation ("back propagation") phase in conjunction with an optimization phase. During the forward propagation phase, input is propagated forward through the neural network, with computation performed at each neuron, layer by layer, until it reaches the output layer. Non-linear activation functions may also be applied at one or more neurons to further direct output to discrete values. The output is then compared to the target output using a loss function, and an error value is calculated for each of the elements in the output layer. During back prop phase the gradients of error function are computed and then propagated backwards through the layers to determine gradients corresponding to each neuron. These gradients are then used to calculate the gradient of the loss function with respect to each of the weights in the network. In the last phase, the calculated gradient is used to update the applied weights in an attempt to minimize the loss function. Once the actual output substantially approximates the target output (e.g., within a threshold of accuracy), the data model is considered complete and further learning may be terminated.

Standard implementations of back propagation typically use 32-bit floating-point (aka single-precision float) representations of real numbers for data storage and manipulation when performing data computations. Typically, single-precision float uses the first bit of a 32-bit floating-point value to denote the sign, the next eight (8) bits for the exponent value, and the remaining twenty three (23) bits for the significand (aka fraction or mantissa). However, the storage and computation of 32-bit values requires considerable memory and processing resources. As a result, new techniques have been developed that rely instead on a reduced precision format. Instead of the full 32 bits, these solutions typically use a 16 bit floating-point (float16) representation. Originally designed for data storage, the traditional float16 format similarly uses the first bit for sign, but only five (5) bits to represent the exponent value, and only ten (10) bits for the fraction/mantissa. The normal positive range of values that can be represented by float16 spans between $2^{-14}$ (approximately—$6.10 \times 10^{-5}$) and $2^{16}$ (approximately 65,504), with the subnormal positive range being between $2^{-24}$ and $2^{-14}$.

Using float16 for training neural (specifically convolutional) networks offers several advantages over traditional single-precision float formats. Specifically, float16 computations can be performed (potentially) significantly faster than single-precision float for computationally intensive layers in the neural network. Significantly less memory is required for storing float16 values. Storage of data in the float16 format also improves performance of bandwidth limited layers, due to the reduced time necessary to transfer data. Finally, storage using the float16 format also allows reductions to the size of the network and the time required to communicate for multi-processor (e.g., multi-GPU) systems.

Unfortunately, the 16 bit float numbers have a significantly narrower numerical range than single-precision float representations. As a result, overflow or underflow can occur when computations are performed that result in numerical values outside of the prescribed ranges. Overflow typically arises in convolutional or fully-connected neural network layers as the result of matrix-matrix multiplication, and can manifest as a very high loss of precision and undesirable not-a-number (NAN) values during training operations, which can appear to an analyst as network divergence. Underflow meanwhile can result in less or even no activations (learning is stopped) during forward-training operations, similarly large loss in precision and network divergence. Overflow and underflow can affect the computation of activations during the forward propagation step of the neural network training cycle and in gradient calculation during the backward propagation step. Both overflow and underflow can also result in a loss of precision during the weight update step of the second phase of the training cycle.

SUMMARY OF THE INVENTION

This Summary is provided to introduce a selection of concepts in a simplified form that are further described below in the Detailed Description. This Summary is not intended to identify key features or essential features of the invention, nor is it intended to be used to limit the scope of the invention.

Embodiments of the present invention are directed to computer-implemented techniques for improving the training of artificial neural networks using a reduced precision (e.g., float16) data format. Embodiments of the present invention rescale tensor values prior to performing matrix operations (such as matrix multiplication or matrix addition) to prevent overflow and underflow. To preserve accuracy throughout the performance of the matrix operations, the scale factors are defined using a novel data format to represent tensors, wherein a matrix is represented by the tuple X, where X=(a, v[.]), wherein a is a float scale factor and v[.] are scaled values stored in the float16 format. The value of any element X[i] according to this data format would be equal to a*v[i]. In this manner, the memory usage and performance advantages of float16 format can be realized while avoiding the problems associated with underflow and overflow.

According to one embodiment of the present invention, a computer-implemented method is provided for performing matrix operations with data represented in a novel reduced precision format. According to embodiments, matrices comprising values represented in a reduced precision floating point data format are accessed. The values are compared to one or more threshold values and scaling factors are determined to correspond to each of the input matrices. In one or more embodiments, the scaling factors are calculated based on the input values such that, when applied to the input values, performing a matrix computation that involves the matrices avoid generating both overflow and underflow values. Once the data values are scaled, the matrix computation is performed with the matrices and the scaling factors are compared and adjusted to maintain consistency of output values resulting from the performance of the matrix computation.

According to another embodiment, a computer-implemented method is provided to perform training for a deep learning network. According to this embodiment, for each layer of a neural network that includes at least a forward propagation layer, a convolutional layer, an inner product layer, and a backward propagation layer, computations are performed using data values expressed as the reduced precision format described above with a scaling factor corresponding to rescaled matrices. According to further embodiments, the convolutional layer perform comprises a gradient computation that generates a gradient output also expressed using the novel data format.

According to yet another embodiment of the present invention, a computer system is provided to perform training for deep learning networks that includes a processor and a memory, wherein data values used to perform computations during training operations are stored in the memory and processed using a reduced precision format wherein a matrix is represented as a tuple with scaled values and a stored scalar.

By providing a reduced precision data format as described herein, complex matrix computations—such as those performed during training of deep networks, including neural networks and convolutional networks—can be advantageously performed in accordance with the embodiments of the present invention efficiently with a fraction of the memory and computation costs while also effectively extending the dynamic range of values to prevent overflow and underflow data values relative to the traditional float16 format.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Reference will now be made in detail to the preferred embodiments of the invention. While the invention will be described in conjunction with the preferred embodiments, it will be understood that they are not intended to be limit to these embodiments. On the contrary, the invention is intended to cover alternatives, modifications and equivalents, which may be included within the spirit and scope as defined by the appended claims.

Furthermore, in the following detailed descriptions of embodiments of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Modified Float16 Format

Embodiments of the invention are directed to novel solutions for improving neural network training algorithms by using a modified float16 format in which a matrix X of data values is represented as a tuple (a, v[.]), where a is a float scale factor and v[.] contains the values of X rescaled by a, such that the value of any element X[i] is equal to a*v[i]. The modification of the float16 data format offers increased protection from overflow and underflow relative to the standard float16 format by extending the potential dynamic range of values. According to embodiments of the invention, the novel data representation described herein can be used to convert single-precision float into a (half-precision) float16 format that uses scalars for exponent extension. Since half-precision float has significantly less bits in the mantissa than single precision float, such conversion will typically result in numerical precision loss when data values exceed a given numerical range. However, by using a common scalar value for all elements in a tensor array, the limits of the numerical range of the matrix can be extended between the range of $[2^{229} \sim 10^{-9}, 2^{29} \sim 10^9]$ Any matrix X can be converted to the modified float16 format without significant precision loss whenever the current range of X fits into the modified float16 range of $2^{29} \sim 10^9$. To estimate the range of a matrix X, the average of the absolute values of non-zero elements in X (as mean(X)), and the maximal absolute value (amax(X)). Using these values, the range of matrix (X) can be estimated to approximate max(x)/mean (X). According to such embodiments, the conversion from the single-precision float32 format to the modified float16 format (a, v[ ]) can be parametrized by using scaling factor a and a conversion target C according to the below expression:

$a = \text{mean}(X)/C$; and $V[i] = C*X[i]/\text{mean}(X)$.

Similarly, the inverse transformation from the modified float16 format to single-precision float can be performed by the operation:

$X_{32}[i] = a*v[i]$.

The specific application of a rescaling algorithm under a modified data format for specific operations is described in greater detail below.

Matrix-Matrix Multiplication

Figure 1:
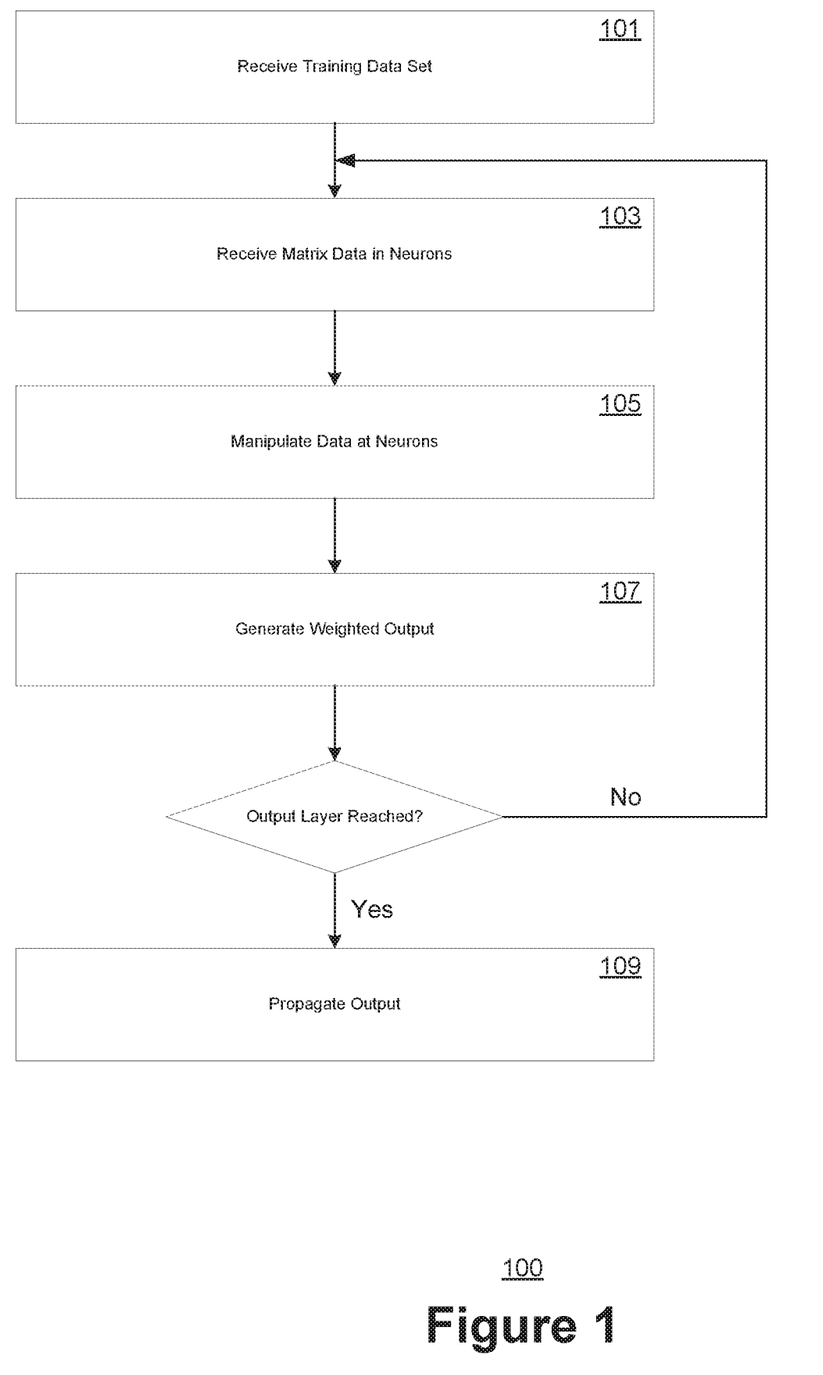
FIG. 1 depicts an exemplary computer-implemented method for training an artificial neural network, in accordance with various embodiments of the present invention.

FIG. 1 depicts an exemplary computer-implemented method for training an artificial neural network. Steps 101-109 describe exemplary steps of the flowchart 100 in accordance with the various embodiments herein described. As depicted in FIG. 1, training of an artificial neural network typically begins at step 101 with receiving a training set of data as input. At step 103, the data is fed (typically as one or more matrices of values) into a corresponding number of neurons. At step 105, the data at each neuron is manipulated according to pre-determined parameters (weights), and a resulting weighted output is generated and passed at step 107 to the next neuron in the next layer in sequence. The neuron in each layer receives the weighted output from the previous neuron as input, and the process is propagated forward at step 109 for each intervening layer between the input and output layers.

Manipulation of the data values at each neuron may include, for example, computing the product of one or more matrices output from neurons from a previous layer (or initial input), or computing the product of an input matrix with a corresponding weight or bias matrix. However, when data values approximate either end of the range of the extended float16 format, multiplication with another matrix may cause overflow or underflow in the resulting product. Embodiments of the present invention are directed to solving this issue by rescaling matrix values using common scalars to avoid overflow and underflow when performing matrix-matrix multiplication.

Appropriate scalar values need to be calculated to effectively avoid overflow and underflow during matrix-matrix multiplication using the modified float16 format. In many instances, the set of possible scalar values can be extensive. As a result, selecting a scalar value may be performed according to any number of selection algorithms as long as the selected scalar value satisfies certain conditions. To avoid underflow during an element-wise multiplication, for example, the product of the mean of non-zero elements in array v (where matrix X=(a,v[.]) and the mean of non-zero elements in array w (where matrix Y=(b, w[.])) must be greater than or equal to the lower threshold of a normal float16 format (roughly 1/65000). This relationship may be expressed as:

$\text{mean}(v)*\text{mean}(w) \geq L0$ (low threshold).

To avoid overflow during an element-wise multiplication, a potential scalar should meet additional conditions. In one embodiments, these conditions are each based on than the upper threshold (U0) of a normal float16 format (e.g., roughly 65,000). Specifically, none of: the product of the mean of non-zero elements in array v and the mean of non-zero elements in array w; the product of the maximum absolute value of v and the mean of w; the product of the number of columns K in matrix X (equal to the number of rows in Matrix Y) and the mean of v and the mean of w; and the maximum absolute values in v or w can be greater than the upper threshold. These conditions may be expressed as:

$$\text{mean}(v)*\text{max}(w) \leq U0; \qquad (1)$$

$$\text{max}(v)*\text{mean}(w) \leq U0; \qquad (2)$$

$$K*\text{mean}(v)*\text{mean}(w) \leq U0; \qquad (3)$$

$$\text{max}(v) \leq U0; \text{ and} \qquad (4)$$

$$\text{max}(w) \leq U0. \qquad (5)$$

Alternately, the conditions may be expressed as:

$\text{mean}(v) \geq L0/\text{mean}(w)$;

$\text{mean}(v) \leq U0/\text{max}(w)$;

$\text{max}(v) \leq U0/\text{mean}(w)$;

$\text{mean}(v) \leq U0/(K*\text{mean}(w))$ $\text{mean}(v) \leq U0/\text{range}(v)$; and $\text{mean}(w) \leq U0/\text{range}(w)$.

For example, to rescale a matrix X (a, v[.]) with a fixed matrix Y (b, w[.]), a second lower threshold L1 and a second upper threshold U1 are calculated. In one or more embodiments, the second lower and upper thresholds act as buffers, and may be calculated as:

$L1 := L0/\text{mean}(w)$; and $U1 := \min(U0/\text{max}(w); U0/(\text{mean}(w)*\text{range}(v)); U0/(\text{mean}(w)*K); U0/\text{range}(v))$.

Matrix X is thereafter rescaled such that mean(v) satisfies the condition $L1 \leq \text{mean}(v) \leq U1$.

Matrix-Matrix Convolution

Embodiments of the present invention can also be extended to matrix-matrix convolution computations. According to such embodiments, convolution may be performed on a two dimensional matrix X (represented as (a, v[.])) and a two dimensional filter Y (represented as (b, w[.])) to calculate the convolved tensor Z. Tensor Z under the modified float16 format could be expressed with scalar c as (c, conv(v, w)). To avoid loss in precision, underflow and overflow must be avoided during the computation of conv(v, w).

To avoid underflow and over during the computation, the data values in v and w must be scaled to meet conditions similar to those described above with respect to matrix-matrix multiplication. Specifically, to avoid underflow, mean(v)*mean(w)≥L0 (low threshold) must also be met during matrix-matrix convolution. Likewise, to avoid overflow, each of the five conditions (save the second condition max(v)*mean(w)≤U0) must also be adhered to:

$$\mathrm{mean}(v)*\mathrm{max}(w) \leq U0; \quad (1)$$

$$K*\mathrm{mean}(v)*\mathrm{mean}(w) \leq U0; \quad (3)$$

$$\mathrm{max}(v) \leq U0; \text{ and} \quad (4)$$

$$\mathrm{max}(w) \leq U0. \quad (5)$$

However, where the value of K in matrix-matrix multiplication corresponds to the number of columns in matrix X and the number of rows in matrix Y, K in matrix-matrix convolution corresponds to the size of the filter Y (e.g., K=filter height*filter weight).

As with matrix-matrix multiplication, to rescale a matrix X (a, v[.]) with a fixed filter Y (b, w[.]), a second lower threshold L1 and a second upper threshold U1 are calculated, and the mean of v must also satisfy the condition:

$$L1 \leq \mathrm{mean}(v) \leq U1;$$

In one or more embodiments, the second lower and upper thresholds act may also be calculated as:

$$L1 := \mathrm{mean}(w);$$

$$U1 := \min(U0/\mathrm{max}(w);\ U0/(\mathrm{mean}(w)*\mathrm{range}(v));\ U0/(\mathrm{mean}(w)*K);\ U0/\mathrm{range}(v)).$$

Additional Tensor Operations

Embodiments of the present invention can also be used to perform operations between tensors. These may include, for example, tensor-scalar multiplication, used to convert data between scaled and un-scaled values, for example. Tensor-scalar multiplication may be performed for the Matrix Y, with scalar b and tensor X (expressed as the modified float16 data format (a, v[.])). In such instances, Y=(a*b, v[.]).

Tensor operations may also include tensor-tensor addition under the modified float16 format. According to these embodiments, where matrix X=(a, v[.]) and Y=(b, w[.]), the sum Z (c, t[.]) is equal to X+Y. In order to convert X and Y to share a common scale, X can be rescaled by d1 and Y by d2 according to the expression:

$$c=a/d1 \text{ and } c=b/d2$$

When this condition is met, the following conversions are also possible:

$$v1[i]=v[i]*d1;$$

$$w1[i]=w[i]*d2;$$

$$\mathrm{mean}(v1)=\mathrm{mean}(v)*d1;$$

$$\mathrm{mean}(w2)=\mathrm{mean}(w)*d2;$$

$$\mathrm{max}(v1)=\mathrm{max}(v)*d1; \text{ and}$$

$$\mathrm{max}(w2)=\mathrm{max}(w)*d2.$$

Since overflow and underflow is still possible (and should be avoided) during this conversion, the scale factors d1 and d2 must also comply with the conditions:

$$L0/\mathrm{mean}(v) \leq d1 \leq U0/\mathrm{max}(v); \text{ and}$$

$$L0/\mathrm{mean}(w) \leq d2 \leq U0/\mathrm{max}(w);$$

These conditions define the possible for c as:

$$\max(a*\max(v), b*\max(w))/U0 \leq c \leq \min(a*\mathrm{mean}(v), b*\mathrm{mean}(w))/L0;$$

According to embodiments, tensors X and Y can be added without significant loss of precision if the interval c is not an empty set.

The specific application of a rescaling algorithm under a modified data format for each phase of a propagation algorithm (e.g., forward propagation, back propagation, and weight update) is described in greater detail below.

Forward Propagation Phase in Convolutional Layers

Convolutional neural networks are a specific extension of neural networks, and often used in image recognition systems—such as facial or object recognition applications, video analysis, natural language processing, and self-driving automobiles. Convolutional neural networks are distinguished from other artificial neural networks by the presence of one or more convolutional layers typically interlieved with non-linear and pooling layers of a standard multi-layer neural network. According to one or more embodiments, the input for a convolutional layer consists of an image, and each convolutional layer has one or more filters (aka kernels) with a smaller dimensional size than the input image, and a number of channels equal to or less than the data channels of the image. The specific dimensions and number of channels may vary between each kernel.

Each kernel is another three-dimensional array of numbers, with the depth the same as the input image, but with a much smaller width and height. To produce a result, a kernel is applied to a grid of points across the input image. At each point where the kernel or filter is applied, all of the corresponding input values and weights are multiplied together, and then summed to produce a single output value at that point. In one or more embodiments, the kernel contains a pattern of weights, and when the filter is applied to a part of the input image that has a similar pattern, a high value is output. When the input doesn't match the pattern, the result is a low number in that position. The output may be received as input in a neuron at the next convolutional layer in the network, or, alternately, in a neuron at an inner product layer.

According to one or more embodiments, forward propagation can be performed for any layer of a neural network (e.g., inner product layers) or convolutional neural network (e.g., convolutional layers+inner product layers). To avoid the issue of vanishing or exploding activations (due to underflow and overflow, respectively), the rescaling operations described above can be performed.

During forward propagation in a convolution layer, the convolutional layer computes an output Y=convolution(X, W)+B, where X[n,c,h,w] contains the data values corresponding to the input into the layer, W[c, o, k, k] contains the data values corresponding to the filters, and B[O] contains the data values corresponding to the biases. According to embodiments, each of the three tensors are represented using the modified float6 format: $X=[\alpha, x_{16}]$, $W=[\beta, w_{16}]$, and $B=[\gamma, b_{16}]$. In one or more embodiments, the direct implementation of a convolutional layer can be reduced to matrix-matrix multiplication using an image to column conversion operations (e.g., im2col in MATLAB). Using such an operation, an image X can be converted into a two-dimensional matrix X' so that Y=X'*W, where X'[p, q], W[q, r], and Y[p, r]. According to such embodiments, matrix X can be expressed as having [p, q] dimensions, matrix W having [q, r] dimensions, and matrix Y having [p, r] dimensions with the following relationships:

$$p=N*H*W;$$

$$q=C*K*K; \text{ and}$$

$$r=O.$$

(where N is the batch size, C the number of input channels, O the number of output channels, K the filter dimensions, and H and W are the dimensions of the image feature map). In one or more embodiments, the absolute value of the output of Y may be limited below an upper threshold U (e.g., the normal maximum range of float16/2) to avoid overflow due to the addition of bias (described below). In one or more embodiments, the absolute value of the output of Y may also be limited to be above a lower threshold L (e.g., the normal minimum range of float16).

According to the above conditioned embodiments, input matrix X is analyzed to determine if rescaling is necessary. Rescaling is necessary to avoid overflow unless the following conditions are met:

$$|y(l,k)|=|x(l,.)|*|w(.,k)|<U; \text{ and}$$

$$amax(x)*max_0(\Sigma_{c,l,j}|w(o; c, l, j)|) \text{ over all weights}<U.$$

Rescaling is also necessary to avoid underflow unless the following conditions are met:

$$amean(x)*amean(w)>L.$$

If both underflow and overflow conditions are true, then rescaling is not necessary as there is little to no risk of loss precision during matrix operations. Otherwise, X and W are rescaled.

According to one or more embodiments, X and W may be rescaled according to the following expressions:

$$X=(\alpha/k1, x'_{16}), \text{ where } x'[i]=x[i]*k1; \text{ and}$$

$$W=(\beta/k2, w'_{16}) \text{ where } w'[i]=w[i]*k2.$$

To ensure that rescaling does not result in overflow, the following conditions may be imposed on the scale values k1 and k2:

$$k1*amax(x)<U; \text{ and}$$

$$k2*amax(w)<U.$$

To guarantee that $|y|<U$, k1 and k2 should satisfy:

$$k1*k2*amax(x)*max\_norm1(w))<U.$$

To prevent underflow after rescaling X and W the following conditions are imposed:

$$amean(x)*k1>L; \text{ and}$$

$$amean(x)*k2>L.$$

To avoid underflow during matrix-matrix multiplication the following conditions are imposed:

$$k1*amean(x)*k2 \, amean(w)>L$$

In sum, the totality of conditions imposed on k1 and k2 include:

$$L/amean(x)<k1<U/amax(x);$$

$$L/amean(w)<k2<U/amax(w); \text{ and}$$

$$L/(amean(x)*amean(w))<k1*k2<U/(amax(x)*max\_norm1(w)).$$

According to one or more embodiments, scale values k1 and k2 may be selected using a variety of methods.

Once X and W are rescaled (or determined to not require rescaling), bias is calculated for the data values. The biased output Z can be expressed as the output matrix Y+bias matrix B such that Z[b, o, h, w]=Y[b, o, h, w]+B[o], where Y=[δ, $y_{16}$], B=[γ, $b_{16}$] and Z=[ε, $z_{16}$]. In one or more embodiments, Z may be calculated using single precision float32 and then converted to float16. Once again, an upper threshold for output on Y and B can be established as U=FP16_MAX/2 with a low threshold L=FP16_MIN.

In order to avoid overflow, the following conditions are imposed:

$$amax(y)*k1<U; \text{ and}$$

$$amax(b)*k2<U.$$

Likewise, to avoid underflow, the following conditions are imposed:

$$amean(y)*k1>L; \text{ and}$$

$$amean(b)*k2>L.$$

Alternately, the relationships can be stated as:

$$L/amean(y)<k1<U/amax(y); \text{ and}$$

$$L/amean(b)<k2<U/amax(b).$$

Backward Propagation Phase in Convolutional Layers

Figure 2:
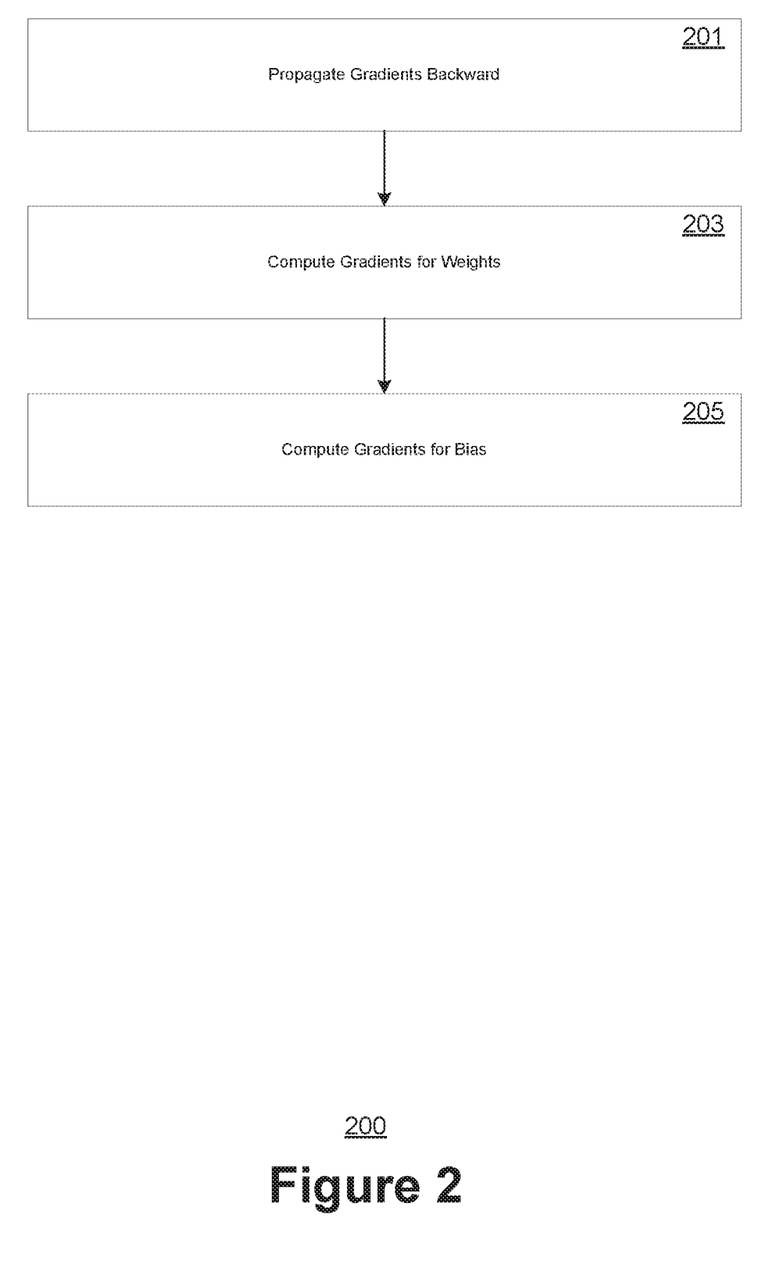
FIG. 2 depicts a flow chart of a sequence of computer-implemented operations performed during backward propagation, in accordance with various embodiments of the present invention.

According to one or more embodiments, three main operations are performed during backward propagation in a convolutional layer. FIG. 2 depicts the three main computer-implemented operations performed during backward propagation. Steps 201-205 describe exemplary steps of the flowchart 100 in accordance with the various embodiments herein described. As depicted in FIG. 2, backward propagation begins at step 201, wherein gradients are propagated backward. In one or more embodiments, the gradient for input matrix X can be calculated as the convolution of the gradient of Y and the values for weights W: e.g., dX=conv (dY, $W^T$).

At step 203, gradients for the weights themselves are calculated. In one or more embodiments, the gradient dW can be calculated as the sum across a batch for the convolution of the gradient of Y and the input matrix X: e.g., dW=$sum_B$ (conv(dY, X)). Finally, at step 205, the gradients for bias are calculated as the sum across a batch of the gradient of Y and a vector $e_1$ of ones (e.g., dB=$sum_B$ (dY*$e_1$)). In one or more embodiments, each of the tensors are expressed according to the modified float16 format as follows: dY=[α, $dy_{16}$], W=[β, $w_{16}$], dX=[γ, $dx_{16}$], dW=[δ, $dw_{16}$], dB=[ε, $db_{16}$].

According to one or more embodiments, the calculated gradients are also propagated backwards. In one or more embodiments, the gradients for matrix X (dX) may be calculated by the convolution of the gradient of Y (dY) using the matrix of weights W as a filter. In order to ensure that the absolute value of dX[i] is less than an upper threshold, (e.g., $|dx[i]|<U$, the following conditions are imposed:

$$amax(dy)*max\_norm1\_t(w)<U,$$

where $max\_norm1\_t(w):=max\_norm1(W^T)=max_c$ ($\Sigma_{o,i,j}|w(c; o,i,j)|$).

To avoid underflow the following condition is imposed:

$$amean(dy)*amean(w)>L$$

If both conditions are true, there is no need to rescale.

However, if any one of the conditions is not met, gradient of Y, dY, and the matrix W are both rescaled such that:

$$dY=(\alpha/k1, dy'_{16}), \text{ where } dy'[i]=dy[i]*k1; \text{ and}$$

$$W=(\beta/k2, w'_{16}), \text{ where } w'[i]=w[i]*k2.$$

To ensure that no overflow can occur during rescaling, scale values k1 and k2 conform to the following conditions:

$$k1*amax(dy)<U; \text{ and}$$

$$k2*amax(w)<U.$$

Likewise, to ensure that no underflow can occur during rescaling, scale values k1 and k2 conform to the following conditions:

$$k1*amean(dy)>L; \text{ and}$$

$$k2*amean(w)>L.$$

Thus, overflow can be avoided during element-wise multiplication when k1 and k2 satisfies the condition: k1*k2<U/(amax(dy)*max_norm1_t(w)). Likewise, underflow can be avoided when k1 and k2 satisfies the following condition: k1*k2*amean(dy)*k2 amean(w)>L. Conditions on k1 and K2 can be alternately represented as:

$$L/amean(dy)<k1<U/amax(dy);$$

$$L/amean(w)<k2<U/amax(w); \text{ and}$$

$$L/(amean(dy)*amean(w))<k1*k2<U/(amax(dy)*max\_norm1\_t(w)).$$

Weight and Bias Gradient Calculation in Convolutional Layers

Once the forward and backward propagation are performed in a neural network, the gradients for the weights that are used to adjust the influence of the data output from each neuron are calculated and subsequently readjusted. In one or more embodiments, the gradients for weights (dW) can be computed as $dW(c,o,.,.)=sum_B (conv(dY*X))$. However, as with previous computation phases, both overflow and underflow can result during the computation of weight gradients. To avoid overflow and underflow, respectively, the following conditions must be met:

$$\max|x|*\max_0(sum_{B,H,W}|dy(.,o,.,.)|)<U; \text{ and}$$

$$mean(x)*mean(dy)>L.$$

Under these conditions, there is no need to rescale. Otherwise a scale k1 for the gradient of the output matrix Y (dY) and a scale k2 for the input matrix X must be calculated such that the following conditions are imposed:

$$k1*k2*\max(x)*max\_norm1\_2(dY)<U,$$

where $max\_norm1\_2(dy):=\max_0(sum_{B,H,W}|dy(.,o,.,.)|)$ $$k1*\max(dY)<U;$$

$$k2*\max(x)<U;$$

$$k1*mean(dY)>L;$$

$$k2*mean(x)>L; \text{ and}$$

$$k1*k2*mean(dY)*mean(x)>L.$$

This gives the following expressions:

$$L/mean(dy)<k1<U/\max(dY);$$

$$L/mean(x)<k2<U/\max(x); \text{ and}$$

$$L/(mean(dY)*mean(x))<k1*k2<U/(\max(x)*max\_norm1\_2(dY)).$$

Forward Propagation Phase in Inner Product Layers

During forward propagation in an inner product layer, the inner product layer computes an output Y for activated values X with weights matrix W and bias B, such that Y=X*W+B. In one or more embodiments, forward propagation within this layer consists of two stages: a first stage during which matrix-matrix multiplication is performed (e.g., GEMM or general matrix-matrix multiplication) on X and W to calculate the output Y, and a second stage that adds the bias to the output Y to calculate the biased output Y'.

During GEMM, the maximal absolute value of x, the maximal normal value of x, and the absolute mean values of x and w are determined and compared with an upper and lower threshold to determine whether the following conditions are true:

$$amax(x)*max\_norm1(w)<U0; \text{ and}$$

$$amean(x)*amean(w)>L0.$$

If both of these conditions are true, there is no need to rescale X or W. Otherwise, scalar values k1 and k2 are calculated such that:

$$L0/amean(x)<k1<U0)/amax(x);$$

$$L0/amean(w)<k2<U0)/amax(w); \text{ and}$$

$$L0/amean(x) \; amean(w))<k1*k2<U0)/(2*amax(x)*max\_norm1(w)).$$

Backward Propagation Phase in Inner Product Layers

According to one or more embodiments, three main operations are performed during backward propagation in a convolutional layer. Similar to the backward propagation performed for convolutional layers, three main operations are also performed during backward propagation in inner product layers. The three main gradient computations include calculating the gradient for input matrix X (dX) as the product of the gradient of Y and the values for weights W: e.g., $dX (b,c,.,.)=dY*W^T$; computing the gradient for weights dW as the sum across a batch for the product of the gradient of Y and the input matrix X: e.g., $dW(c,o,.,.)=sum_B (dY*X)$; and computing the gradients for bias dB(o) as the sum across a batch of the gradient of Y and a vector $e_1$ of ones (e.g., $dB=sum_B(dY*e_1)$). In one or more embodiments, each of the tensors are expressed according to the modified float16 format as follows: $dY=[\alpha, dy_{16}]$, $W=[\beta, w_{16}]$, $dX=[\gamma, dx_{16}]$, $dW=[\delta, dw_{16}]$, $dB=[\epsilon, db_{16}]$.

According to one or more embodiments, the bias gradient can be calculated as $$dB(o)=sum_B(dY*e_1).$$

To avoid overflow, the following condition must be met:

$$\max_0(sum_{B,H,W}|dy(.,o,.,.)|)<U.$$

If the condition is met, there is no need to rescale. Otherwise the scale factor k1 is computed, such that:

$$k1*max\_norm1\_2(dy)<U; \text{ and}$$

$$k1*mean(dY)>L0,$$

where $max\_norm1\_2(dy):=\max_0(sum_{B,H,W}|dy(.,o,.,.)|)$

The conditions thereafter imposed on k1 can be expressed as:

$$L0/\text{mean}(dY) < k1 < U/\text{max\_norm1\_2}(dy).$$

According to one or more embodiments, the weight gradient can be calculated as:

$$dW(c,o,,,.)=\text{sum}_B(dY^*X).$$

To avoid overflow, the following condition must be met:

$$\max(x)^*\max_0(\text{sum}_{B,H,W}|dy(.,o,,,.)|) < U.$$

If there is also no risk of underflow (e.g., if the condition mean(x)*mean(dy)>L0, is met), then there is no need to rescale. Otherwise the scale factor k1 for dY and scale factor k2 for X, is computed, such that:

$$k1^*k2^*\max(x)^*\text{max\_norm1\_2}(dy) < U;$$

$$k1^*\max(dy) < U;$$

$$k2^*\max(x) < U;$$

$$k1^*\text{mean}(dy) > L0;$$

$$k2^*\text{mean}(x) > L0; \text{ and}$$

$$k1^*k2^*\text{mean}(dy)^*\text{mean}(x) > L0.$$

The conditions thereafter imposed on k1 and k2 can be expressed as:

$$L0/\text{mean}(dy) < k1 < U/\max(dy);$$

$$L0/\text{mean}(x) < k2 < U/\max(x); \text{ and}$$

$$L0/\text{mean}(dy)^*\text{mean}(x) < k1^*k2^* < U/(\max(x) *\text{max\_norm1\_2}(dy)).$$

According to one or more embodiments, the gradient backward propagation can be calculated as $dX = dY^*W^t$. To ensure that $|dx[i]| < U$ (e.g. U=FP16_MAX to avoid overflow), the following condition is imposed:

$$\text{amax}(dy)^*\text{max\_norm1\_}t(w) < U, \text{ where}$$

$$\text{max\_norm1\_}t(w) := \text{max\_norm1}(W^T) = \max_c(\Sigma_{o,i,j}|w(c; o,i,j)|).$$

To avoid underflow, the following condition must be met:

$$\text{amean}(dy)^*\text{amean}(w) > L0.$$

If both conditions are true, there is no need to rescale. Otherwise dY and W are rescaled such that:

$$dY = (\alpha/k1, dy'_{16}), \text{ where } dy'[i]=dy[i]^*k1; \text{ and}$$

$$W = (\beta/k2, w'_{16}), \text{ where } w'[i]=w[i]^*k2.$$

To ensure that there is no risk of overflow or underflow after rescaling, the following constraints are imposed:

$$k1^*\text{amax}(dy) < U0;$$

$$k2^*\text{amax}(w) < U0; \text{ and}$$

$$k1^*\text{amean}(dy) > L0;$$

$$k2^*\text{amean}(w) > L0.$$

The conditions thereafter imposed on k1 and k2 can be expressed as:

$$k1^*k2 < U0/(\text{amax}(dy)^*\text{max\_norm1\_}t(w));$$

$$k1^*k2^*\text{amean}(dy)^*k2\ \text{amean}(w) > L0;$$

$$L0/\text{amean}(dy) < k1 < U0/\text{amax}(dy);$$

$$L0/\text{amean}(w) < k2 < U0/\text{amax}(w); \text{ and}$$

$$L0/(\text{amean}(dy)\text{amean}(w)) < k1^*k2 < U0/(\text{amax}(dy) *\text{max\_norm1}_{13}t(w)).$$

Embodiments of the present invention have been described herein in the context of convolutional and inner product layers. However, alternate embodiments may be adapted for use in additional layers, including, but not limited to, Scale layers, Bias Layers, and Batch normalization layers, each of which can be represented using the modified float16 data format described herein.

Weights Update

Training of deep networks is commonly based on stochastic gradient descent (SGD). In one or more embodiments, the following formula is applied during weights update:

$$W(t+1) = W(t) - \lambda^* \Delta W(t).$$

Initially gradients are very small, so λ*ΔW(t) is much smaller than W, and well below normal float16 range, therefore, using traditional float16 format may cause the gradients to vanish. As a solution, the modified float16 data format described herein can be extended to prevent the loss of gradient data (precision). At later stages in training, gradients can be high, but λ becomes small, so λ*ΔW(t) becomes much smaller than W, and the weight update will disappear in traditional float16 formats due to rounding. The graph of loss can resemble a plateau, but in fact it is just loss of accuracy during weight update.

There are a number of possible solutions for this "vanishing update" problem.

One possible solution is to use an extra copy of weights in float (32 bits) format. According to such embodiments, one copy of weights is stored in memory as float32, and a second as float16 for forward and backward propagation. The float32 version of the weights W(t+1) is used to keep accumulating small weights updates. Single precision float32 to float16 conversion is used to generate a float16 set of weights, which is used for forward-backward computations. Another possible solution is to modify SGD algorithm with momentum, which includes adding a weight decay, computing a momentum, computing an update based on the momentum, and applying the update to the weights.

Figure 3:
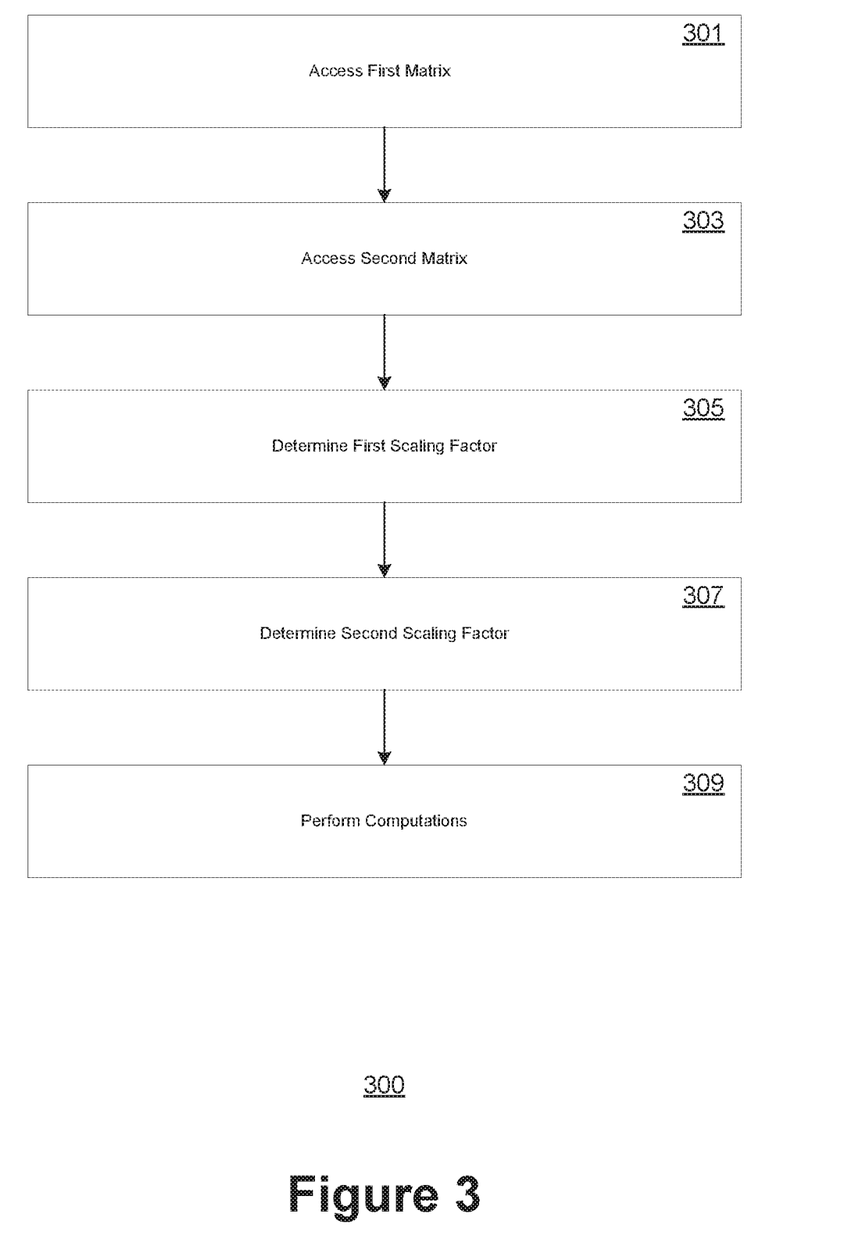
FIG. 3 depicts a flow chart of a computer-implemented method for performing a matrix computation, in accordance with various embodiments of the present invention.

FIG. 3 depicts a flowchart 300 of an exemplary computer-implemented process for performing matrix computations in accordance with various embodiments of the present invention. Steps 301-309 describe exemplary steps of the flowchart 300 in accordance with the various embodiments herein described. In one or more embodiments, a portion or an entirety of the steps in flowchart 300 may be performed in a processing device, such as a central processing unit or graphics processing unit of a computing device.

At step 301, a first matrix X is accessed. At step 303, a second matrix Y is accessed. In one or more embodiments, data values contained in matrices X and Y comprise values represented in a reduced precision floating point format, such as a float16 data format. In still further embodiments, the values in matrices X and Y do not exceed (in either direction) a range of values between a pre-determined high threshold and a pre-determined low threshold. In one or more embodiments, the data values comprising at least one of X and Y may be accessed from a memory device. According to further embodiments, the data values may comprise a training set of pre-supplied data.

At step 305, a common scaling factor a is determined for the values in X. At step 307, a common scaling factor b is determined for the values in Y. According to one or more embodiments, the scaling factors a and b are used to rescale the values in their respective matrices X and Y by a corresponding amount. In still further embodiments, the scaling factors are calculated such that overflow and underflow are avoided during matrix computations such as matrix-matrix multiplication or matrix-matrix convolution, etc. Finally, a matrix computation is performed at step 309 using the scaling factors and rescaled values corresponding to X and Y.

Exemplary Computing Device

Figure 4:
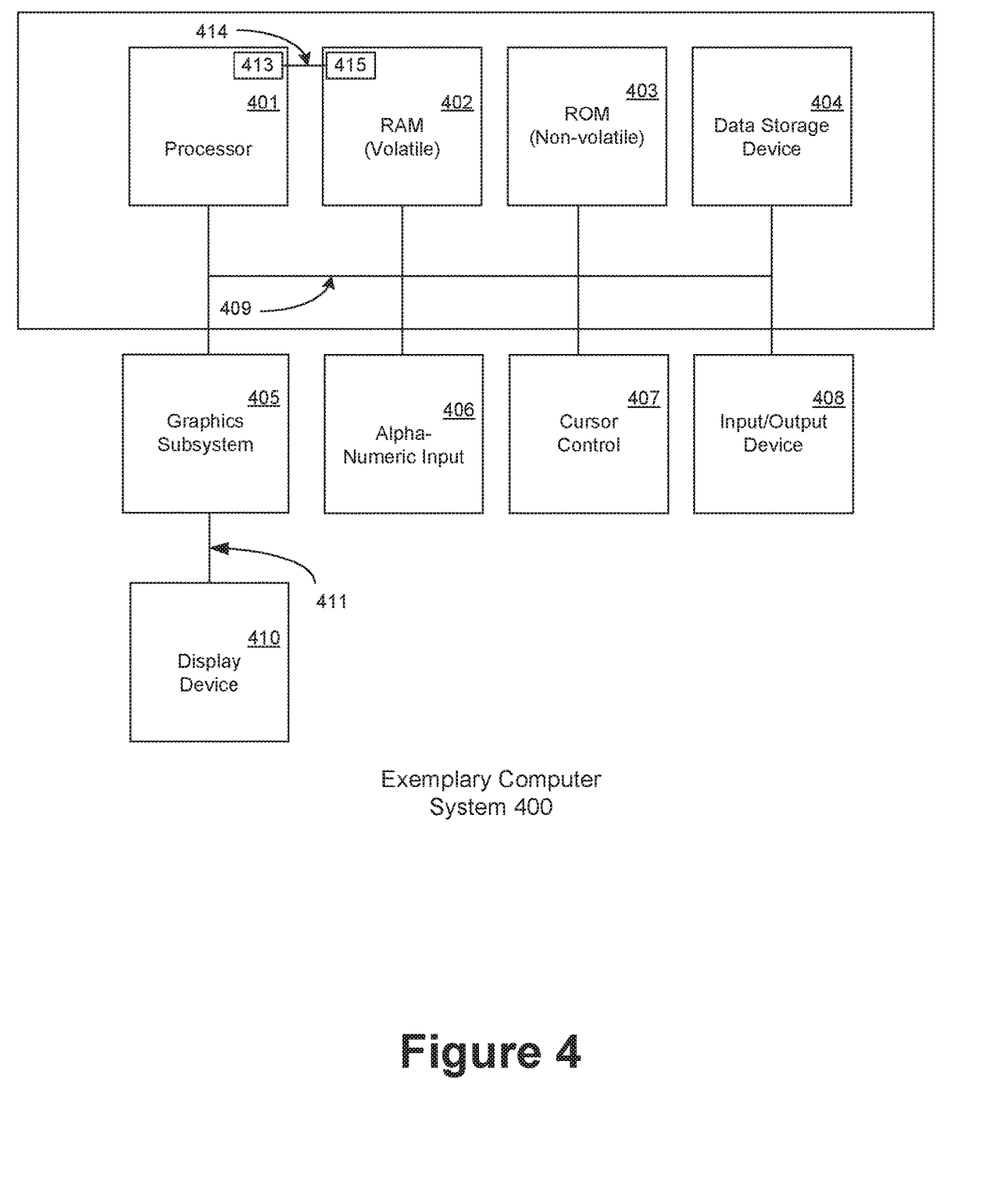
FIG. 4 depicts an exemplary computing system upon which embodiments of the present invention may be implemented, in accordance with various embodiments of the present invention.

As presented in FIG. 4, an exemplary computer system upon which embodiments of the present invention may be implemented includes a general purpose computing system with one or more integrated circuits, such as computing system 400. In its most basic configuration, computing system 400 typically includes at least one processing unit 401 and memory, and an address/data bus 409 (or other interface) for communicating information. Depending on the exact configuration and type of computing system environment, memory may be volatile (such as RAM 402), non-volatile (such as ROM 403, flash memory, etc.) or some combination of the two. In one or more embodiments, the processing unit 401 may be used to perform (in whole or in part) the rescaling operations or computations described above with respect to FIGS. 1-3.

Computer system 400 may also comprise an optional graphics subsystem 405 for presenting information to the computer user, e.g., by displaying information on an attached display device 410, connected by a video cable 411. According to embodiments of the present claimed invention, the graphics subsystem 405 may be coupled directly to the display device 410 through the video cable 411. A graphical user interface of an image viewing software application executing in the computer system 400 may be generated in the graphics subsystem 405, for example, and displayed to the user in the display device 410. In alternate embodiments, display device 410 may be integrated into the computing system (e.g., a laptop or netbook display panel) and will not require a video cable 411. In one embodiment, the processes 200 and 300 may be performed, in whole or in part, by graphics subsystem 405 in conjunction with the processor 401 and memory 402, with any resulting output displayed in attached display device 410.

Additionally, computing system 400 may also have additional features/functionality. For example, computing system 400 may also include additional storage (removable and/or non-removable) including, but not limited to, magnetic or optical disks or tape. Such additional storage is illustrated in FIG. 4 by data storage device 407. Computer storage media includes volatile and nonvolatile, removable and non-removable media implemented in any method or technology for storage of information such as computer readable instructions, data structures, program modules or other data. RAM 402, ROM 403, and data storage device 407 are all examples of computer storage media.

Computer system 400 also comprises an optional alphanumeric input device 406, an optional cursor control or directing device 407, and one or more signal communication interfaces (input/output devices, e.g., a network interface card) 408. Optional alphanumeric input device 406 can communicate information and command selections to central processor 401. Optional cursor control or directing device 407 is coupled to bus 409 for communicating user input information and command selections to central processor 401. Signal communication interface (input/output device) 408, also coupled to bus 409, can be a serial port. Communication interface 409 may also include wireless communication mechanisms. Using communication interface 409, computer system 400 can be communicatively coupled to other computer systems over a communication network such as the Internet or an intranet (e.g., a local area network), or can receive data (e.g., a digital television signal).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method comprising:
receiving training data for training a neural network;
applying the training data to the neural network;
accessing a first matrix, XI, and a second matrix, YI, wherein XI and YI include values represented in a reduced precision floating point format from a low threshold to a high threshold;
determining, based at least on the values, one of an overflow or an underflow would result from a matrix computation using XI and YI;
based at least in least on the determining one of the overflow or the underflow would result, determining, based at least on one or more conditions associated with avoiding the overflow or the underflow, a first scaling factor, a, for XI and a second scaling factor, b, for YI;
generating a first updated matrix, X2, by at least updating the values of X1 using a and a second updated matrix, Y2, by at least updating the values of Y1 using b;
generating, based at least on performing a matrix computation using a*X2 and b*Y2 as inputs, an output that does not result in one of the overflow or the underflow; and
updating, based at least on the output, at least one of one or more weights or one or more biases associated with the neural network.

2. The method as described in claim 1, wherein the reduced precision floating point format comprises a float16 floating point format.

3. The computer-implemented method as described in claim 1, wherein the matrix computation comprises at least one of: matrix multiplication; matrix convolution; or matrix addition.

4. The computer-implemented method as described in claim 1, wherein the matrix computation is performed using a hardware computation unit of a graphics processing unit.

5. The computer-implemented method as described in claim 1, wherein the determining the first scaling factor, a, comprises:
computing a maximum absolute value, max (X), of the values of the first matrix, XI;

computing a mean value, mean (X), of non-zero values of the values of the first matrix, XI; and computing a range value, range (X), as [max (X)/mean (X)].

6. The computer-implemented method as described in claim 5, wherein the determining the second scaling factor, b, comprises:

computing a maximum absolute value, max (Y), of the values of the second matrix, YI;

computing a mean value, mean (Y), of non-zero values from the values of the second matrix, YI; and computing a range value, range (Y), as [max (Y)/mean (Y)].

7. The computer-implemented method as described in claim 6, wherein the matrix computation comprises matrix multiplication, and wherein the determining the first scaling factor, a, and the second scaling factor, b, further comprises:

selecting the a and the b such that:
[a*mean (X) * b*mean (Y)] is equal to or greater than the low threshold;
[a*mean (X) * b*max (Y)] is equal to or less than the high threshold;
[b*mean (Y) * a*max (X)] is equal to or less than the high threshold;
K* [a*mean (X) * b*mean (Y)] is equal to or less than the high threshold, wherein K is a constant;
a*max (X) is equal to or less than the high threshold; and
b*max (Y) is equal to or less than the high threshold.

8. The computer-implemented method as described in claim 6, wherein the matrix computation comprises matrix convolution, and wherein the determining the first scaling factor, a, and the second scaling factor, b, further comprises:

selecting the a and the b such that:
[a*mean (X) * b*mean (Y)] is equal to or greater than the low threshold;
[a*mean (X) * b*max (Y)] is equal to or less than the high threshold;
[a*max (X) * b*max (Y)] is equal to or less than the high threshold;
K* [a*mean (X) * b*mean (Y)] is equal to or less than the high threshold, wherein K is a constant;
a*max (X) is equal to or less than the high threshold; and
b*max (Y) is equal to or less than the high threshold.

9. The computer-implemented method of claim 1, further comprising performing one or more inference operations based at least on provided input data and using the neural network with the at least one of the one or more weights or the one or more biases updated.

10. The computer-implemented method of claim 1, further comprising determining the one or more conditions based at least on one or more of a minimum threshold or a maximum threshold that will avoid one of the overflow or the underflow.

11. A computer-implemented method comprising:

receiving training data for training a neural network;

applying the training data to the neural network;

accessing a first matrix, XI, and a second matrix, YI, wherein XI and YI include values represented in a float16 floating point format from a low threshold to a high threshold;

determining, based at least on the values, one of an overflow or an underflow would result from a matrix computation using XI and YI;

based at least on the determining one of the overflow or the underflow would result, determining, based at least on one or more conditions associated with avoiding the overflow and the underflow, a first scaling factor, a, for XI and a second scaling factor, b, for YI;

generating a first updated matrix, X2, by at least updating the values of X1 using a and a second updated matrix, Y2, by at least updating the values of Y1 by b;

performing computations of a forward propagation layer, a convolutional layer, an inner product layer, and a backward propagation layer, wherein the convolutional layer comprises a gradient computation that comprises a matrix computation that takes a*X2 and b*Y2 as inputs and generates a gradient output that does not result in one of the overflow or the underflow; and updating, based at least on the gradient output, at least one of one or more weights or one or more biases associate with the neural network.

12. The computer-implemented method as described in claim 11, wherein the matrix computation is performed using a hardware computation unit of a graphics processing unit.

13. The computer-implemented method as described in claim 12, wherein the determining the first scaling factor, a, comprises:

computing a maximum absolute value, max (X), of the values of the first matrix, X1;

computing a mean value, mean (X), of non-zero values of the values of the first matrix, XI; and computing a range value, range (X), as [max (X)/mean (X)].

14. The computer-implemented method as described in claim 13, wherein the determining the second scaling factor, b, comprises:

computing a maximum absolute value, max (Y), of the values of the second matrix, Y1;

computing a mean value, mean (Y), of non-zero values from the values of the second matrix, YI; and computing a range value, range (Y), as [max (Y)/mean (Y)].

15. The computer-implemented method as described in claim 14, wherein the matrix computation comprises matrix multiplication, and wherein the determining the first scaling factor, a, and the determining the second scaling factor, b, further comprises:

selecting the a and the b such that:
[a*mean (X) * b*mean (Y)] is equal to or greater than the low threshold;
[a*mean (X) * b*max (Y)] is equal to or less than the high threshold;
[b*mean (Y) * a*max (X)] is equal to or less than the high threshold;
K* [a*mean (X) * b*mean (Y)] is equal to or less than the high threshold, wherein K is a constant;
a*max (X) is equal to or less than the high threshold; and
b*max (Y) is equal to or less than the high threshold.

16. The computer-implemented method as described in claim 14, wherein the matrix computation comprises matrix convolution, and wherein the determining the first scaling factor, a, and the second scaling factor, b, further comprises:

selecting the a and the b such that:
[a*mean (X) * b*mean (Y)] is equal to or greater than the low threshold;
[a*mean (X) * b*max (Y)] is equal to or less than the high threshold;
[a*max (X) * b*max (Y)] is equal to or less than the high threshold;

K* [a*mean (X) * b*mean (Y)] is equal to or less than the high threshold, wherein K is a constant;

a*max (X) is equal to or less than the high threshold; and b*max (Y) is equal to or less than the high threshold.

17. A system comprising:

one or more processing units to:

receive training data for training a neural network;

apply the training data to the neural network;

access a first matrix, XI, and a second matrix, YI, wherein XI and YI include values represented in a float16 floating point format from a low threshold to a high threshold;

determine, based at least on the values, one of an overflow or an underflow would result from a matrix computation using XI and YI;

based at least on the determination of one of the overflow or the underflow would result, determine, based at least on one or more conditions associated with avoiding the overflow or the underflow, a first scaling factor, a, for XI and a second scaling factor, b, for YI;

generate a first updated matrix, X2, by at least updating the values of X1 using a and a second updated matrix, Y2, by at least updating the values of Y1 using b;

perform computations of a forward propagation layer, a convolutional layer, an inner product layer, and a backward propagation layer, wherein the convolutional layer comprises a gradient computation that comprises a matrix computation that takes a*X2 and b*Y2 as inputs and generates a gradient output that does not result in one of the overflow or the underflow; and update, based at least on the gradient output, at least one of one or more weights or one or more biases associated with the neural network.

18. The system as described in claim 17, wherein the determination of the first scaling factor, a, comprises:

computing a maximum absolute value, max (X), of the values of the first matrix, XI;

computing a mean value, mean (X), of non-zero values of the values of the first matrix, XI; and computing a range value, range (X), as [max (X)/mean (X)].

19. The system as described in claim 18, wherein the determination of the second scaling factor, b, comprises:

computing a maximum absolute value, max (Y), of the values of the second matrix, Y1;

computing a mean value, mean (Y), of non-zero values from the values of the second matrix, YI; and computing a range value, range (Y), as [max (Y)/mean (Y)].

20. The system of claim 17, wherein the one or more processing units are further to perform one or more inference operations based at least on provided input data and using the neural network with the at least one of the one or more weights or the one or more biases updated.

* * * * *

UNITED STATES PATENT AND TRADEMARK OFFICE
CERTIFICATE OF CORRECTION

PATENT NO. : 12,299,577 B2
APPLICATION NO. : 15/624577
DATED : May 13, 2025
INVENTOR(S) : Boris Ginsburg et al.

Page 1 of 1

It is certified that error appears in the above-identified patent and that said Letters Patent is hereby corrected as shown below:

In the Claims

In Column 16, Line 37, delete "in least".

Signed and Sealed this
Twenty-fourth Day of June, 2025

Coke Morgan Stewart
*Acting Director of the United States Patent and Trademark Office*